(12) United States Patent
Kim et al.

(10) Patent No.: US 12,199,295 B2
(45) Date of Patent: Jan. 14, 2025

(54) SECONDARY BATTERY

(71) Applicant: Samsung SDI Co., Ltd., Yongin-si (KR)

(72) Inventors: Dae Kyu Kim, Yongin-si (KR); Jin Young Moon, Yongin-si (KR); Sung Gwi Ko, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 402 days.

(21) Appl. No.: 17/597,470

(22) PCT Filed: Jun. 29, 2020

(86) PCT No.: PCT/KR2020/008484
§ 371 (c)(1),
(2) Date: Jan. 6, 2022

(87) PCT Pub. No.: WO2021/006518
PCT Pub. Date: Jan. 14, 2021

(65) Prior Publication Data
US 2022/0285764 A1  Sep. 8, 2022

(30) Foreign Application Priority Data

Jul. 8, 2019  (KR) ........................ 10-2019-0082214

(51) Int. Cl.
*H01M 50/152*  (2021.01)
*H01M 50/107*  (2021.01)
(Continued)

(52) U.S. Cl.
CPC ....... *H01M 50/152* (2021.01); *H01M 50/107* (2021.01); *H01M 50/147* (2021.01);
(Continued)

(58) Field of Classification Search
CPC .. H01M 50/10; H01M 50/152; H01M 50/107; H01M 50/186
See application file for complete search history.

(56) References Cited

U.S. PATENT DOCUMENTS 8,071,230 B2  12/2011  Kim et al.
9,397,323 B2   7/2016  Kim
(Continued)

FOREIGN PATENT DOCUMENTS

CN    107302062 A    10/2017
CN    107305931 A    10/2017
(Continued)

OTHER PUBLICATIONS

International Search Report, with English translation, dated Oct. 12, 2020, for PCT/KR2020/008484, 6 pages.
(Continued)

*Primary Examiner* — Kenneth J Douyette
(74) *Attorney, Agent, or Firm* — Lewis Roca Rothgerber Christie LLP

(57) ABSTRACT

The present invention relates to a secondary battery, wherein the length of a second bending portion of a safety plate covering an extension portion of a cap-up can be adjusted to prevent deformation of the safety plate and improve the sealing force of the secondary battery, even when a crimping part having a flat upper structure in which the sealing force can deteriorate due to the low compression rate of an insulating gasket is used. For example, disclosed is a secondary battery comprising: a cylindrical can; an electrode assembly which, together with an electrolyte, is accommodated in the cylindrical can; a cap assembly coupled to an upper portion of the cylindrical can; and an insulating gasket interposed between the cap assembly and the cylindrical can. The cap assembly comprises: a cap-up; and a safety plate which is installed below the cap-up and has a second
(Continued)

bending portion that surrounds an extension portion of an edge of the cap-up and covers a portion of the upper surface of the extension portion. A second length, which is the length of the second bending portion, has any one value between 50% to 54%, inclusive, of a first length, which is the length of the extension portion.

9 Claims, 4 Drawing Sheets

(51) Int. Cl.
  *H01M 50/147*  (2021.01)
  *H01M 50/167*  (2021.01)
  *H01M 50/183*  (2021.01)
  *H01M 50/186*  (2021.01)
  *H01M 50/342*  (2021.01)
  *H01M 50/578*  (2021.01)
  *H01M 50/591*  (2021.01)

(52) U.S. Cl.
  CPC ....... *H01M 50/167* (2021.01); *H01M 50/183* (2021.01); *H01M 50/186* (2021.01); *H01M 50/3425* (2021.01); *H01M 50/578* (2021.01); *H01M 50/591* (2021.01); *H01M 2200/20* (2013.01)

(56) References Cited

U.S. PATENT DOCUMENTS

| | | | |
|---|---|---|---|
| 10,090,497 B2 | 10/2018 | Kim et al. | |
| 10,333,120 B2 | 6/2019 | Lee et al. | |
| 10,490,792 B2 | 11/2019 | Lee et al. | |
| 10,622,608 B2 | 4/2020 | Ko et al. | |
| 2007/0212595 A1 | 9/2007 | Kim et al. | |
| 2009/0233157 A1 | 9/2009 | Kim | |
| 2011/0223472 A1* | 9/2011 | Ikeda | H01M 50/186 429/174 |
| 2017/0294635 A1 | 10/2017 | Kim et al. | |
| 2017/0301899 A1 | 10/2017 | Lee et al. | |
| 2017/0309880 A1 | 10/2017 | Ko et al. | |
| 2018/0159100 A1 | 6/2018 | Lee et al. | |

FOREIGN PATENT DOCUMENTS

| | | |
|---|---|---|
| JP | 10-162799 A | 6/1998 |
| KR | 20-1999-0023886 U | 7/1999 |
| KR | 10-2007-0093171 A | 9/2007 |
| KR | 10-0878701 B1 | 1/2009 |
| KR | 10-2009-0099273 A | 9/2009 |
| KR | 2014-0106328 A | 9/2014 |
| KR | 10-2017-0116370 A | 10/2017 |
| KR | 10-2017-0120979 A | 11/2017 |
| KR | 10-1948620 B1 | 2/2019 |

OTHER PUBLICATIONS

Chinese Office Action for CN Patent Application No. 202080057596.2 dated Jan. 24, 2024.

European Search Report for EP Patent Application No. 20836287.1 dated Jan. 15, 2024, 16 pages.

* cited by examiner

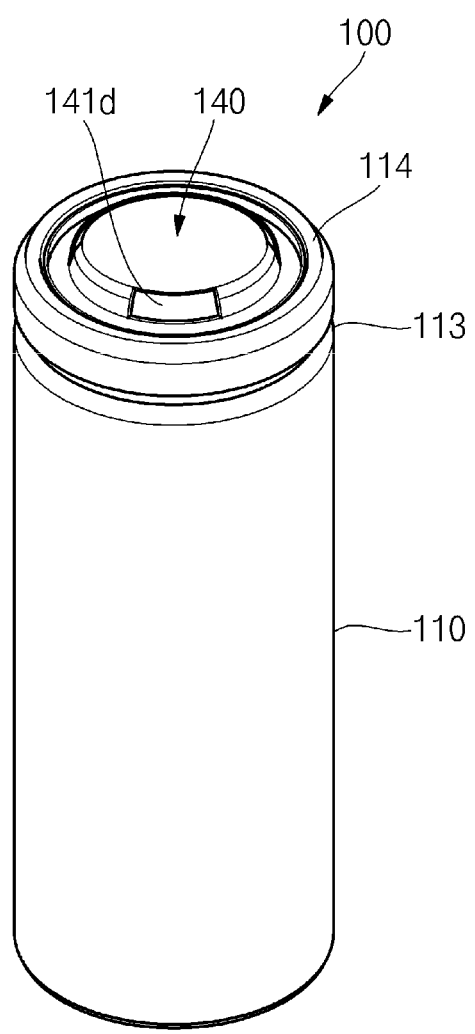
[FIG. 1a]

[FIG. 1b]
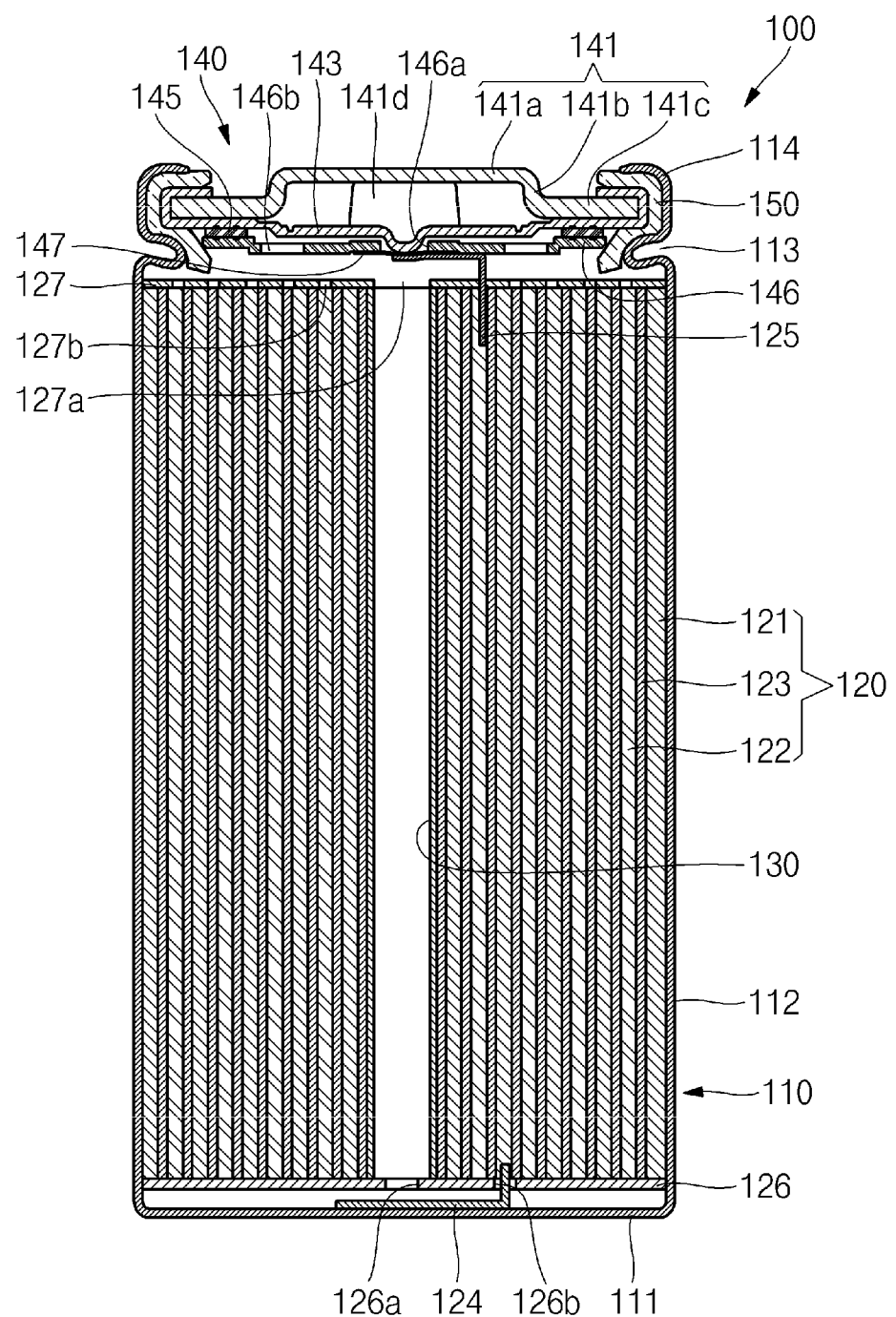

[FIG. 1c]
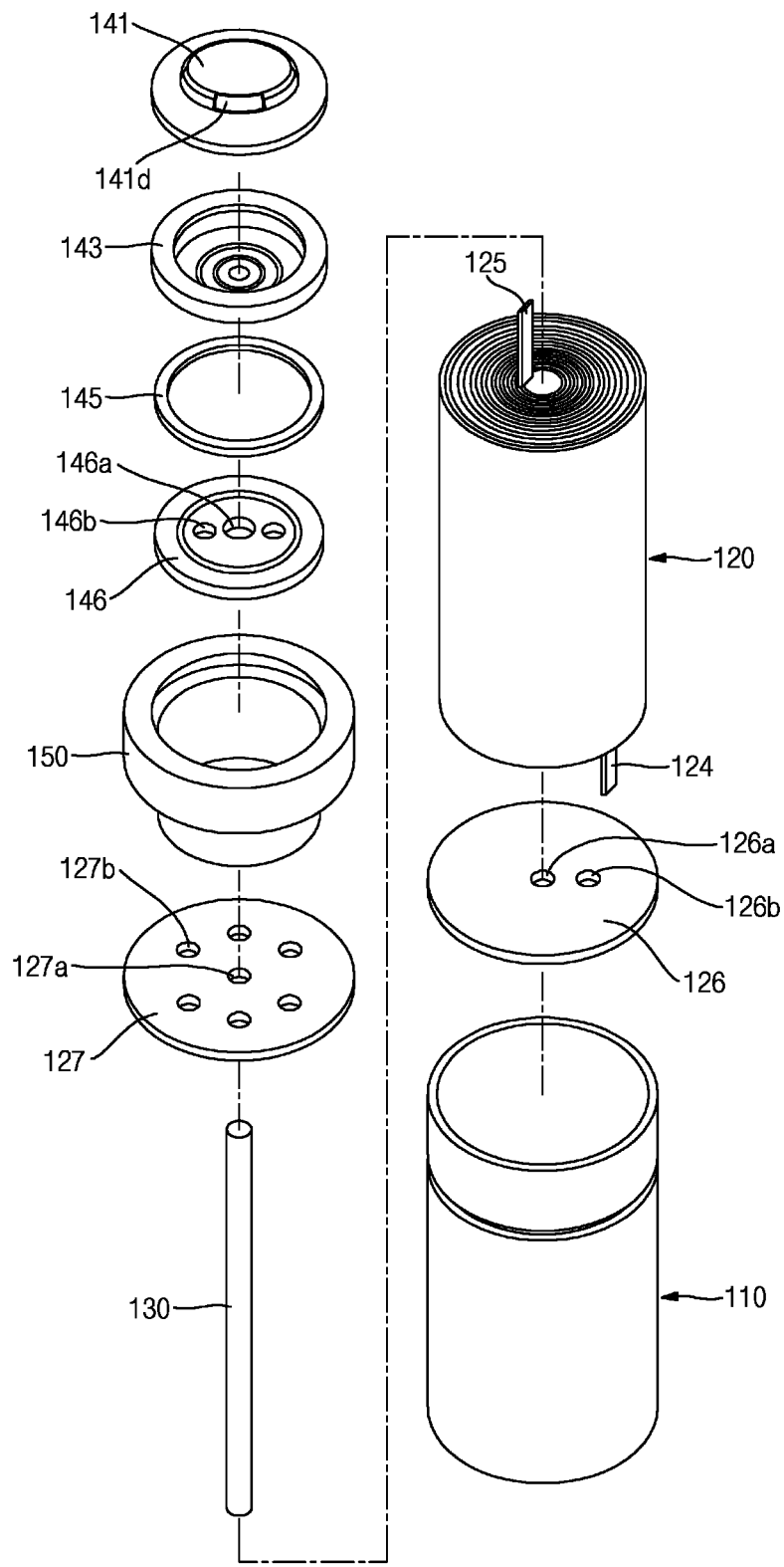

[FIG. 2]
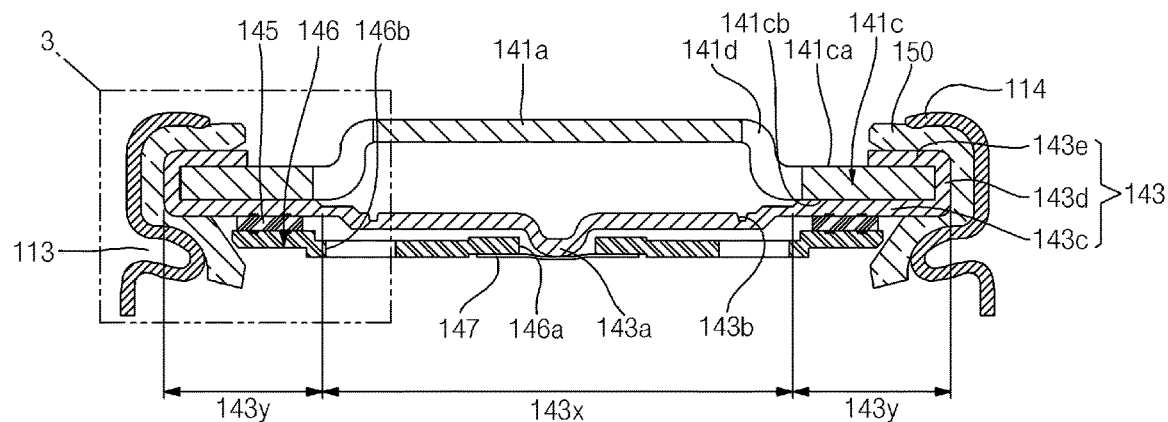
[FIG. 3]
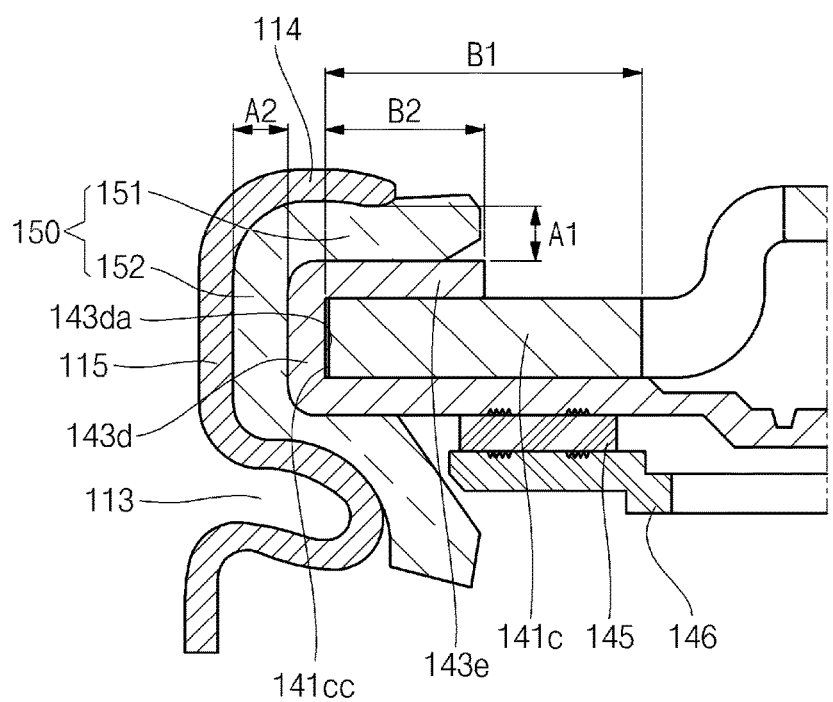

SECONDARY BATTERY

CROSS-REFERENCE TO RELATED APPLICATION(S)

This application is a U.S. National Phase Patent Application of International Application Number PCT/KR2020/008484, filed on Jun. 29, 2020, which claims priority of Korean Patent Application Number 10-2019-0082214, filed on Jul. 8, 2019, the entire content of each of which is incorporated herein by reference.

TECHNICAL FIELD

Various embodiments of the present invention relate to a secondary battery.

BACKGROUND ART

A secondary battery is a power storage system that provides excellent energy density to change electrical energy into chemical energy so as to store the chemical energy. When compared to non-rechargeable primary batteries, secondary batteries are rechargeable and are widely used for IT devices such as smartphones, cellular phones, laptops, tablet PCs, and the like. Recently, interests in electric vehicles have increased to prevent environmental pollution, and thus, high-capacity secondary batteries are being adopted for the electric vehicles. Such secondary batteries are required to have characteristics such as high density, high output, and stability.

The above-described information disclosed in the technology that serves as the background of the present invention is only for improving understanding of the background of the present invention and thus may include information that does not constitute the related art.

Disclosure of the Invention

Technical Problem

The present invention provides a secondary battery, in which a second bending portion of a safety plate covering an extension portion of a cup-up is capable of being adjusted in length to prevent the safety plate from being deformed and improve sealing force of the secondary battery, even though a crimping part having a flat upper structure, in which the sealing force is deteriorated due to a low compression rate of an insulating gasket, is applied.

Technical Solution

A secondary battery according to an embodiment of the present invention may include a cylindrical can, an electrode assembly which is accommodated in the cylindrical can together with an electrolyte, a cap assembly coupled to an upper portion of the cylindrical can, and an insulating gasket interposed between the cap assembly and the cylindrical can, wherein the cap assembly may include a cap-up and a safety plate including a second bending portion installed on a lower portion of the cap-up, configured to surround an extension portion of an edge of the cap-up, and configured to cover a portion of a top surface of the extension portion, and a second length that is a length of the second bending portion has any one value of 50% or more to 54% or less of a first length that is a length of the extension portion.

The safety plate may include: a main body disposed below the cap-up, a first bending portion bent upward from the main body and spaced a predetermined distance from an edge surface of the extension portion, and the second bending portion horizontally bent inward from an upper portion of the first bending portion to extend so as to be in contact with a top surface of the extension portion.

The cylindrical can may include a circular bottom portion, a side portion bent upward from the bottom portion to extend, a beading portion recessed inward at a lower portion of the cap assembly, a crimping part bent inward at an upper portion of the beading portion, and a can connecting portion configured to connect the beading portion to the crimping part.

The crimping part may be bent from an upper end of the can connecting portion in a substantially horizontal direction so that a top surface of the crimping part has an upper flat structure of which a top surface is flat.

The insulating gasket may include a first region interposed between the cramping portion of the cylindrical can and the second bending portion of the safety plate and pressed in a direction of the second bending portion by the crimping part, and a second region interposed between the can connecting portion of the cylindrical can and the first bending portion of the safety plate.

A compression ratio that is a ratio of a thickness compressed by being pressed by the crimping part to a thickness before the first thickness of the first region is pressed by the crimping part may have any one value of 10% or more to 15% or less.

A compression ratio that is a value obtained by dividing a value, which is obtained by subtracting a first thickness that is a thickness of the first region from a second thickness that is a thickness of the second region, by the second thickness may have any one of 10% or more to 15% or less.

The cap-up may include a terminal portion, a connecting portion bent downward from an edge of the terminal portion, and the extension portion horizontally extending outward from a lower end of the connecting portion.

Extension lines of the first length and the second length may pass through a center point of the cap-up and a center point of the safety plate, respectively.

Advantageous Effects

In the secondary battery according to the embodiment of the present invention, the second bending portion of the safety plate covering the extension portion of the cup-up may be capable of being adjusted in length to prevent the safety plate from being deformed and improve the sealing force of the secondary battery, even though the crimping part having the flat upper structure, in which the sealing force is deteriorated due to the low compression rate of the insulating gasket, is applied.

BRIEF DESCRIPTION OF THE DRAWINGS

FIGS. 1a and 1b are perspective, cross-sectional, and exploded views of a secondary battery according to various embodiments of the present invention.

FIG. 2 is a cross-sectional view illustrating a relationship between a cylindrical can and a cap assembly of the secondary battery according to various embodiments of the present invention.

FIG. 3 is an enlarged view of a portion 3 of FIG. 2.

MODE FOR CARRYING OUT THE INVENTION

Hereinafter, preferred embodiments will be described in detail with reference to the accompanying drawings.

The present invention may, however, be embodied in many different forms and should not be construed as being limited to the embodiments set forth herein; rather, these embodiments are provided so that those skilled in the art thoroughly understand the present invention. Rather, these embodiments are provided so that this disclosure will be thorough and complete, and will fully convey the scope of the present invention to those skilled in the art.

Also, in the drawing figures, the dimensions of layers and regions may be exaggerated for clarity of illustration. Like reference numerals refer to like elements throughout. As used herein, the term "and/or" includes any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise/include" and/or "comprising/including" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, may be used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as "beneath" or "below" may change into "above" or "upper". Thus the term "below" may encompass the term "above" or "below".

FIGS. 1a and 1b are perspective, cross-sectional, and exploded views of a secondary battery 100 according to various embodiments of the present invention.

Referring to FIGS. 1a, 1b and 1c, the secondary battery 100 according to the present invention includes a cylindrical can 110, an electrode assembly 120, and a cap assembly 140.

In addition, the present invention may further include a center pin 130 coupled to the electrode assembly 120.

The cylindrical can 110 includes a circular bottom portion 111 and a side portion 112 extending by a predetermined length upward from the bottom portion 111. During a process of manufacturing the secondary battery, an upper portion of the cylindrical can 110 is opened. Thus, during the process of assembling the secondary battery, the electrode assembly 120 may be inserted into the cylindrical can 110 together with an electrolyte. The cylindrical can 110 may be formed of steel, a steel alloy, aluminum, an aluminum alloy, or an equivalent thereof, but the material thereof is not limited thereto. In addition, in the cylindrical can 110, a beading portion 113 recessed inward may be formed at a lower portion of the cylindrical can 110 with respect to the cap assembly 140 to prevent the cap assembly 140 from being separated to the outside, and a crimping part 114 bent inward may be formed at an upper portion of the cylindrical can 110 with respect to the cap assembly 140.

The electrode assembly 120 is accommodated in the cylindrical can 110. The electrode assembly 120 includes a negative electrode plate 121 coated with a negative electrode active material (e.g., graphite, carbon, etc.), a positive electrode plate 122 coated with a positive electrode active material (e.g., transition metal oxide ($LiCoO_2$, $LiNiO_2$, $LiMn_2O_4$, etc.), and a separator 123 disposed between the negative electrode plate 121 and the positive electrode plate 122 to prevent short circuit from occurring and allowing lithium ions to move only. The negative electrode plate 121, the positive electrode plate 122, and the separator 123 are wound in a substantially cylindrical shape. Here, the negative electrode plate 121 may be copper (Cu) or nickel (Ni) foil, the positive electrode plate 122 may be aluminum (Al) foil, and the separator 123 may be polyethylene (PE) or polypropylene (PP), but is not limited to the above materials. In addition, the negative electrode plate 121 may include at least one negative electrode tab 124 protruding downward by a predetermined length, and the positive electrode plate 122 may include at least one positive electrode tab 125 protruding upward by a predetermined length. Here, the negative electrode tab 124 and the positive electrode tab 125 may be provided as separate metal plates and may be welded to the negative electrode plate 121 and the positive electrode plate 122, respectively. Of course, on the contrary, the negative electrode tab 124 may protrude and extend to an upper side of the electrode assembly 120, and the positive electrode tab 125 may protrude and extend to a lower side of the electrode assembly 120. In addition, the negative electrode tab 124 may be made of copper or nickel, and the positive electrode tab 125 may be made of aluminum, but the present invention is not limited thereto.

Also, the negative electrode tab 124 of the electrode assembly 120 may be welded to the bottom portion 111 of the cylindrical can 110. Thus, the cylindrical can 110 may act as a negative electrode. Of course, on the contrary, the positive electrode tab 125 may be welded to the bottom portion 111 of the cylindrical can 110, and in this case, the cylindrical can 110 may operate as a positive electrode.

In addition, a first insulating plate 126 coupled to the cylindrical can 110 and having a first hole 126a at a center thereof and a second hole 126b formed in the outside thereof may be interposed between the electrode assembly 120 and the bottom portion 111. The first insulating plate 126 serves to prevent the electrode assembly 120 from electrically contacting the bottom portion 111 of the cylindrical can 110. Particularly, the first insulating plate 126 serves to prevent the positive electrode plate 122 of the electrode assembly 120 from electrically contacting the bottom portion 111. Here, the first hole 126a serves to allow a gas to quickly move upward through the center pin 130 when a large amount of gas is generated due to abnormality in the secondary battery, and the second hole 126b serves to allow the negative electrode tab 124 to pass therethrough so as to be welded to the bottom portion 111.

In addition, a second insulating plate 127 coupled to the cylindrical can 110 and having a first hole 127a at a center thereof and a plurality of second holes 126b formed in the outside thereof may be interposed between the electrode assembly 120 and the bottom portion 140. The second insulating plate 127 serves to prevent the electrode assembly 120 from electrically contacting the cap assembly 140. Particularly, the second insulating plate 127 serves to prevent the negative electrode plate 121 of the electrode assembly 120 from electrically contacting the cap assembly 140. Here, the first hole 127a serves to allow a gas to quickly move to the cap assembly 140 when a large amount of gas is generated due to abnormality in the secondary battery, and the second hole 126b serves to allow the positive electrode tab 125 to pass therethrough so as to be welded to the cap assembly 140. In addition, the remaining second hole 127b serves to allow the electrolyte to quickly flow into the electrode assembly 120 during a process of injecting the electrolyte.

In addition, each of the first holes 126a and 127a of the first and second insulating plates 126 and 127 has a diameter less than that of the center pin 130 so that the center pin 130 does not in electrical contact with the bottom portion 111 of the cylindrical can 110 or the cap assembly 140 by an external impact.

The center pin 130 may have a hollow circular pipe shape and may be coupled to the approximately center of the electrode assembly 120. The center pin 130 may be formed of steel, a steel alloy, aluminum, an aluminum alloy, or polybutylene terepthalate, but the material thereof is not limited thereto. The center pin 130 serves to suppress deformation of the electrode assembly 120 during charging and discharging of the battery and serves as a passage for a gas generated inside the secondary battery. In some cases, the center pin 130 may be omitted.

The cap assembly 140 may include a cap-up 141 having a plurality of through-holes 141d, a safety plate 143 installed on a lower portion of the cap-up 141, a connecting ring 145 installed on a lower portion of the safety plate 143, a cap-down 146 coupled to the connecting ring 145 and having first and second through-holes 146a and 146b, and a sub-plate 147 fixed to a lower portion of the cap-down 146 and electrically connected to the positive electrode tab 125. Of course, the cap-down 146 and the sub-plate 147 may be integrally formed, and in this case, the positive electrode tab 125 may be fixed to the cap-down 146.

The cap-up 141 may have a convex upper portion to be electrically connected to an external circuit. In addition, the cap-up 141 is provided with a gas discharge hole 141 that provides a passage through which the gas generated inside the cylindrical can 110 is discharged. The cap-up 141 is electrically connected to the electrode assembly 110 to transmits current generated in the electrode assembly 110 to an external circuit.

The safety plate 143 is provided as a circular plate body corresponding to the cap-up 141. A protrusion 143a protruding downward is formed at a center of the safety plate 143. The safety plate 143 is electrically connected to the sub-plate 147 fixed to a bottom surface of the cap-down 146 by using the protrusion 143a passing through the through-hole 146a of the cap-down 146. Here, the protrusion 143a of the safety plate 143 and the sub plate 147 may be welded through laser welding, ultrasonic welding, resistance welding, or an equivalent method thereof. Also, a notch 143b for guiding breakage of the safety plate 143 is formed on an outer circumference of the protrusion 143a.

An outer circumference of the safety plate 143 is installed to be in close contact with an outer circumference of the cap-up 141. In addition, the outer circumference of the safety plate 143 may be bent and extend upward to surround the outer circumference of the cap-up 141 so that the safety plate 143 and the cap-up 141 are in contact with each other. That is, an edge of the safety plate 143 may surround the cap-up 141 to extend to an upper side of the cap-up 141, thereby covering a top surface of the cap-up 141. The relationship between the safety plate 143 and the cap-up 141 will be described in detail below. The safety plate 143 discharges the internal gas while blocking current when an abnormal internal pressure occurs in the cylindrical can 110. In the safety plate 143, when the internal pressure of the cylindrical can 110 is equal to or greater than an operation pressure of the safety plate 143, the protrusion 143a ascends upward by the gas discharged through the gas discharge hole 146a of the cap-down 146 and thus is electrically separated from the sub-plate 147. Here, the sub-plate 147 is electrically separated from the safety plate 143 while the welded portion of the protrusion 143a is torn. Also, when the internal pressure of the case 110 is greater than or equal to a breaking pressure that is higher than the operation pressure of the safety plate 143, the notch 152 is broken to prevent the secondary battery 100 from being exploded.

The connecting ring 145 is interposed between the safety plate 143 and the cap-down 146 to insulate the safety plate 143 and the cap-down 146 from each other. Specifically, the connection ring 145 is interposed between the outer circumference of the safety plate 143 and the outer circumference of the cap-down 146. The connecting ring 145 may be made of a resin material such as polyethylene (PE), polypropylene (PP), polyethylene terephthalate (PET), or the like.

The cap-down 146 is provided as a circular plate body. The through-hole 146a is formed at the center of the cap-down 146, and the protrusion 143a of the safety plate 143 passes through the through-hole 146a. Also, the gas discharge hole 146b is formed at one side of the cap-down 146, and the sub-plate 147 is coupled to the lower portion of the cap-down 146. The gas discharge hole 146b serves to discharge the internal gas when an excessive internal pressure is generated in the cylindrical can 110. Here, the protrusion 143a of the safety plate 143 may ascend by the gas discharged through the gas discharge hole 146b, and thus, the protrusion 143a may be separated from the sub-plate 147. The sub-plate 147 is welded between the protrusion 143a of the safety plate 143, which passes through the through-hole 146a of the cap-down 146, and the positive electrode tab 125. Thus, the sub-plate 147 electrically connects the positive electrode tab 125 to the safety plate 143.

In general, when short circuit occurs in the secondary battery 100, the internal pressure increases, and thus, the internal gas is discharged through the gas discharge hole 146b of the cap-down 146. Here, the protrusion 143a of the safety plate 143 ascends by the discharged gas and then is electrically separated from the sub-plate 147 to cut off the current.

Also, an insulating gasket 150 that insulates the cap assembly 140 from a side portion 111 of the cylindrical can 110 is provided.

The insulating gasket 150 is installed in an upper opening of the cylindrical can 110. Here, the insulating gasket 150 is substantially compressed between a beading portion 113, which is formed on the side portion of the cylindrical can 110, and the crimping part 114. That is, the insulating gasket 150 is assembled by being in close contact with the outer circumferences of the cap-up 141and the safety plate 143, and the upper opening of the cylindrical can 110. Here, the cap-up 141 coupled to the safety plate 143 may be fixed to an upper end of the cylindrical can 110 in a state in which the insulating gasket 150 is interposed by the crimping part 114 formed on the upper end of the cylindrical can 110.

The insulating gasket 150 may be made of a resin material such as polyethylene (PE), polypropylene (PP), polyethylene terephthalate (PET), or the like. The insulating gasket 150 may prevent the cap assembly 130 from being separated from the cylindrical can 110.

Furthermore, an electrolyte (not shown in the drawing) is injected inside the cylindrical can 110 to serve so that lithium ions generated by electrochemical reaction in the negative electrode plate 121 and the positive electrode plate 122 inside the battery during the charging and discharging is movable. The electrolyte may be a non-aqueous organic electrolyte that is a mixture of lithium salt and a high-purity organic solvent. Furthermore, the electrolyte may be a polymer using a polymer electrolyte or a solid electrolyte, and the type of the electrolyte is not limited here.

Referring to FIG. 2, a relationship between the cylindrical can 110 and the cap assembly 140 in the secondary battery 100 according to various embodiments of the present invention is illustrated, and referring to FIG. 3, an enlarged view of a portion 3 in FIG. 2 is illustrated.

Hereinafter, a coupling relationship between the cylindrical can 110 and the cap assembly 140 and a coupling structure of the safety plate 143 and the cap-up 141 in the cap assembly 140 will be described in detail with reference to FIGS. 2 and 3.

The cap-up 141 of the cap assembly 140 includes a terminal portion 141a, a connecting portion 141b, and an extension portion 141c, which are sequentially disposed in an outward direction from the center.

The terminal portion 141a may be approximately flat and may be disposed at a substantially center of the cap-up 141. In addition, when the terminal portion 141a connects a plurality of secondary batteries 100 in series or in parallel to form a module, a positive electrode pack tab PT for connecting the plurality of secondary batteries 100 to each other is welded on a top surface of the terminal portion 141a.

The connecting portion 141b is formed by being bent downward from an edge of the terminal portion 141a and includes at least one opening 141d. The opening 141d is configured to discharge the gas inside the cylindrical can 110 to the outside when the vent 143b of the safety plate 143 is broken.

Also, the extension portion 141c may extend outward from a lower end of the connecting portion 141b in a horizontal direction. An edge surface 141cc of the extension portion 141c may be surrounded by the safety plate 143. Preferably, portions of a bottom surface 141cb and a top surface 141ca of the extension portion 141c may be in contact with the safety plate 143. Here, the edge surface 141cc may be a surface connecting the bottom surface 141cb and the top surface 141ca of the extension portion 141c.

The cap-up 141 may be made of any one selected from general aluminum, an aluminum alloy, steel, a steel alloy, nickel, a nickel alloy, and equivalents thereof, and the material thereof is not limited in the present invention.

The safety plate 143 of the cap assembly 140 includes a main body 143c, a first bending portion 143d, and a second bending portion 143e, which are sequentially disposed in an outward direction from the center. The main body 143c is disposed at the lower portion of the cap-up 141, a plurality of vent grooves 143b are formed in an upper surface of the main body 143c. In addition, the protrusion 143a protruding downward is formed at the substantially center of the sub-plate 147 and connected to the sub-plate 147. Here, the protrusion 143a and the vent grooves 143b may be disposed in a central area 143x of the main body 143c. Here, the central area 143x is an area disposed below the terminal portion 141a and the connecting portion 141b of the cap-up 141. In addition, an outer area 143y of the main body 143c may be in contact with the bottom surface 141cb of the extension portion 141c of the cap-up 141.

The first bending portion 143d may be bent upward from the edge of the main body 143c to surround the edge surface 141cc of the extension portion 141c of the cap-up 141 described above. That is, an inner surface 143da of the first bending portion 143d may face the edge surface 141cc of the extension portion 141c. Here, the first bending portion 143d may be spaced a predetermined distance from the edge surface 141cc of the extension portion 141c of the cap-up 141.

The second bending portion 143e may be horizontally bent inward from an upper portion of the first bending portion 143d to extend, thereby partially covering the top surface 141ca of the extension portion 141c of the cap-up 141. The second bending portion 143e may be bent inward to be in contact with the top surface 141ca of the extension portion 141c of the cap-up 141. That is, the safety plate 143 may surround the extension portion 141c of the cap-up 141 by the first bending portion 143d and the second bending portion 143e so as to be coupled to the cap-up 141.

The cap assembly 140, in which the cap-up 141 and the safety plate 143 are coupled, may be seated on the upper end of the cylindrical can 110 and then be coupled and fixed to the cylindrical can 110 by the bending of the crimping part 114 of the cylindrical can 110. Here, the insulating gasket 150 for the electrical insulation may be interposed between the cylindrical can 110 and the cap assembly 140. In more detail, after the cap assembly 140 is seated in the state in which the insulating gasket 150 interposed on an upper portion of the beading portion 113 of the cylindrical can 110, the crimping part 114 of the cylindrical can 110 may be bent to an inner direction of the cap assembly 140 to press the insulating gasket 150 having a uniform thickness, thereby coupling the cap assembly 140 and the cylindrical can 110 to each other.

Here, the crimping part 114 may be bent to be substantially horizontal with the second bending portion 143e of the safety plate 143 and the extension portion 141c of the cap-up 141. As described above, the crimping unit 114 may have an upper flat structure of which a top surface is substantially flat, and when the terminal portion 141a connects a plurality of secondary batteries 100 in series or in parallel to form a module, a negative electrode pack tab PT for connecting the plurality of secondary batteries 100 to each other is welded on a top surface of the terminal portion 141a. That is, in the plurality of secondary batteries 100 provided with the crimping part 114 having the upper flat structure, since both the positive pack tab and the negative pack tab are welded to the upper area, there may be no need to provide a separate line structure on a lower region of the secondary battery 110, and thus, the module may be simplified in structure.

Here, the cylindrical can 110 may further include a can connecting portion 115 that connects the beading portion 113 to the crimping part 114 and extends in an approximately vertical direction.

A compression ratio of the insulating gasket 150 pressed by the crimping part 114 may be any one of 10% or more to 15% or less. Here, the compression ratio may be calculated through a first thickness A1 that is a thickness of a first region 151 of the insulating gasket 150 interposed between the crimping part 114 of the cylindrical can 110 and the second bending portion 143e of the safety plate 143 and a second thickness A2 that is a thickness of a second region 152 of the insulating gasket 150 interposed between the can connecting portion 115 and the first bending portion 143d of the safety plate 143. Here, the first thickness A1 and the second thickness A2 may be the same before being pressed by the crimping part 114. A compression ratio Cg of the insulating gasket 150 may be a ratio of a thickness compressed by being pressed by the crimping part 114 to a thickness before the first thickness A1 of the first region 151 is pressed by the crimping part 114 and may be expressed as in Equation 1 below.

$$Cg = \frac{A2 - A1}{A2} \quad \text{[Equation 1]}$$

Here, since the first thickness A1 and the second thickness A2 are the same before being pressed by the crimping part 114, the second thickness A2 may be a thickness before the first thickness A1 is pressed by the crimping part 114.

In addition, a second length B2 that is a length of the second bending portion 143e of the safety plate 143, may have any one value of 50% or more to 54% or less of a first length B1 that is a total length of the extension portion 141c. That is, the second bending portion 143e may cover a portion of an area adjacent to an edge of a top surface of the extension portion 141c. Here, the first length B1 and the second length B2 may be disposed in the same line as diameters of the cap-up 141 and the safety plate 143. That is, extension lines of the first length B1 and the second length B2 may pass through a center point of the cap-up 141 and a center point of the safety plate 143, respectively.

If the second length B2 exceeds 54% of the first length B1, when the second bending portion 143e in the safety plate 143 is bent, the second bending portion 143e may not be in close contact with the top surface of the extension portion 141c of the cap-up 141 by deformation due to overlapping or wrinkles. Also, when the second length B2 is less than 50% of the first length B1, sealing between the cap assembly 140 and the cylindrical can 110 may not be maintained.

In Table 1 below, a sealing value between the cap assembly 140 and the cylindrical can 110 according to the ratio of the second length B2 to the first length B1 and experimental result data on whether the safety plate is deformed are shown. The experimental result data below was measured while changing a size of the second length B2 according to the ratio when the first length B1 has a constant value (for example, 3.56 mm).

TABLE 1

| B2/B1(%) | Sealing value (kgf/cm2) | Whether safety plate is deformed |
|---|---|---|
| 57% | 30 | Deformation |
| 56% | 30 | Deformation |
| 55% | 30 | Deformation |

TABLE 1-continued

| B2/B1(%) | Sealing value (kgf/cm2) | Whether safety plate is deformed |
|---|---|---|
| 54% | 30 | X |
| 53% | 30 | X |
| 52% | 30 | X |
| 51% | 30 | X |
| 50% | 30 | X |
| 49% | 20.22 | X |
| 48% | 19.34 | X |
| 47% | 18.78 | X |
| 46% | 16.56 | X |

Additionally, it is seen that Table 2 shows that, in order to calculate the sealing value in Table 1, a sealing value is measured five times according to the ratio of the second length B2 to the first length B1, and a result obtained by calculating an average value of the five measured sealing values is applied as the sealing value in Table 1. That is, the sealing value in Table 1 was obtained by measuring the sealing value several times according to the ratio of the second length B2 to the first length B1 and calculating the average value thereof, and thus, an occurrence of errors that may occur in the measurement of the result data was reduced.

TABLE 2

| B2/B1(%) | Sealing value 1 | Sealing value 2 | Sealing value 3 | Sealing value 4 | Sealing value 5 | Average sealing value (kgf/cm$^2$) |
|---|---|---|---|---|---|---|
| 57% | 30 | 30 | 30 | 30 | 30 | 30 |
| 56% | 30 | 30 | 30 | 30 | 30 | 30 |
| 55% | 30 | 30 | 30 | 30 | 30 | 30 |
| 54% | 30 | 30 | 30 | 30 | 30 | 30 |
| 53% | 30 | 30 | 30 | 30 | 30 | 30 |
| 52% | 30 | 30 | 30 | 30 | 30 | 30 |
| 51% | 30 | 30 | 30 | 30 | 30 | 30 |
| 50% | 30 | 30 | 30 | 30 | 30 | 30 |
| 49% | 18.4 | 21.2 | 20.9 | 19.5 | 21.1 | 20.22 |
| 48% | 19.1 | 18.8 | 19 | 19.8 | 20 | 19.34 |
| 47% | 18 | 19.4 | 18.8 | 19 | 18.7 | 18.78 |
| 46% | 16.4 | 15.8 | 16.6 | 16.5 | 17.5 | 16.56 |

As shown in the experimental results of Tables 1 and 2, when a ratio of the second length B2 to the first length B1 is 55%, which exceeds 54%, deformation occurred in the safety plate 143. In addition, when a ratio of the second length B2 to the first length B1 is 49% that is less than 50%, the sealing value is 20.22 kgf/cm$^2$, which is less than 30 kgf/cm$^2$ that is a normal sealing value, and thus, the sealed state between the cap assembly 140 and the cylindrical can 110 may not be maintained to cause a problem such as leakage of the electrolyte. In the secondary battery as described above, even when the crimping part 114 having the upper flat structure in which the sealing pressure is lowered due to the compression ratio of the insulating gasket 150, is applied, the length of the second bending portion 143e of the safety plate 143, which covers the extension portion 141c of the cap-up 141, may be adjusted to prevent the safety vent from being deformed and also increase in sealing pressure of the secondary battery 100.

The above-mentioned embodiment is merely an embodiment of the secondary battery, and thus, the present invention is not limited to the foregoing embodiment, and also it will be understood by those of ordinary skill in the art that various changes in form and details may be made therein without departing from the spirit and scope of the present invention as defined by the following claims.

INDUSTRIAL APPLICABILITY

The present invention may be applied to fields of secondary batteries for home use, industrial use, and vehicles.

The invention claimed is:

1. A secondary battery comprising:
a cylindrical can;
an electrode assembly which is accommodated in the cylindrical can together with an electrolyte;
a cap assembly coupled to an upper portion of the cylindrical can; and
an insulating gasket interposed between the cap assembly and the cylindrical can,
wherein the cap assembly comprises a cap-up and a safety plate comprising a second bending portion installed on a lower portion of the cap-up, configured to surround an extension portion of an edge of the cap-up, and configured to cover a portion of a top surface of the extension portion,
a second length that is a length of the second bending portion has any one value of 50% or more to 54% or less of a first length that is a length of the extension portion.

2. The secondary battery of claim 1, wherein the safety plate comprises:
a main body disposed below the cap-up;
a first bending portion bent upward from the main body and spaced a predetermined distance from an edge surface of the extension portion; and
the second bending portion horizontally bent inward from an upper portion of the first bending portion to extend so as to be in contact with a top surface of the extension portion.

3. The secondary battery of claim 2, wherein the cylindrical can comprises:
a circular bottom portion;
a side portion bent upward from the circular bottom portion to extend;
a beading portion recessed inward at a lower portion of the cap assembly;
a crimping part bent inward at an upper portion of the beading portion; and
a can connecting portion configured to connect the beading portion to the crimping part.

4. The secondary battery of claim 3, wherein the crimping part is bent from an upper end of the can connecting portion in a substantially horizontal direction so that a top surface of the crimping part has an upper flat structure of which a top surface is flat.

5. The secondary battery of claim 3, wherein the insulating gasket comprises:
a first region interposed between the crimping part of the cylindrical can and the second bending portion of the safety plate and pressed in a direction of the second bending portion by the crimping part; and
a second region interposed between the can connecting portion of the cylindrical can and the first bending portion of the safety plate.

6. The secondary battery of claim 5, wherein a compression ratio that is a ratio of a thickness compressed by being pressed by the crimping part to a thickness before the first thickness of the first region is pressed by the crimping part has any one value of 10% or more to 15% or less.

7. The secondary battery of claim 5, wherein a compression ratio that is a value obtained by dividing a value, which is obtained by subtracting a first thickness that is a thickness of the first region from a second thickness that is a thickness of the second region, by the second thickness has any one of 10% or more to 15% or less.

8. The secondary battery of claim 1, wherein the cap-up comprises:
a terminal portion;
a connecting portion bent downward from an edge of the terminal portion; and
the extension portion horizontally extending outward from a lower end of the connecting portion.

9. The secondary battery of claim 1, wherein extension lines of the first length and the second length pass through a center point of the cap-up and a center point of the safety plate, respectively.

* * * * *

UNITED STATES PATENT AND TRADEMARK OFFICE
CERTIFICATE OF CORRECTION

PATENT NO. : 12,199,295 B2
APPLICATION NO. : 17/597470
DATED : January 14, 2025
INVENTOR(S) : Dae Kyu Kim et al.

It is certified that error appears in the above-identified patent and that said Letters Patent is hereby corrected as shown below:

In the Claims

In Column 12, Line 20, in Claim 6, after "the" delete "first".

Signed and Sealed this
Sixth Day of May, 2025

Coke Morgan Stewart
*Acting Director of the United States Patent and Trademark Office*